(12) United States Patent
Kim et al.

(10) Patent No.: US 10,620,157 B2
(45) Date of Patent: Apr. 14, 2020

(54) SINGLE POINT DETECTION TYPE MICROFLUIDIC ISOELECTRIC FOCUSING ASSAY AND CHIPS USING THE SAME

(71) Applicant: Myongji University Industry and Academia Cooperation Foundation, Yongin-si (KR)

(72) Inventors: Dohyun Kim, Yongin-si (KR); Jin Song, Yongin-si (KR); Nebiyu Getachew Arega, Yongin-si (KR)

(73) Assignee: MYONGJI UNIVERSITY INDUSTRY AND ACADEMIA COOPERATION FOUNDATION, Gyeonggi-Do (KR)

( * ) Notice: Subject to any disclaimer, the term of this patent is extended or adjusted under 35 U.S.C. 154(b) by 183 days.

(21) Appl. No.: 15/729,905

(22) Filed: Oct. 11, 2017

(65) Prior Publication Data
US 2018/0275096 A1    Sep. 27, 2018

(30) Foreign Application Priority Data

Mar. 27, 2017 (KR) ........................ 10-2017-0038364

(51) Int. Cl.
*G01N 27/447* (2006.01)

(52) U.S. Cl.
CPC . *G01N 27/44704* (2013.01); *G01N 27/44795* (2013.01)

(58) Field of Classification Search
CPC ............................ C07K 1/28; G01N 27/44795
See application file for complete search history.

(56) References Cited

U.S. PATENT DOCUMENTS

| 6,939,452 B2 * | 9/2005 | Foret ................. B01L 3/502715 204/451 |
| 9,377,440 B2 | 6/2016 | Wu et al. |

(Continued)

FOREIGN PATENT DOCUMENTS

| KR | 101521879 | 5/2015 |
| KR | 1020160107386 | 9/2016 |
| WO | 2016090064 A1 | 6/2016 |

OTHER PUBLICATIONS

Weiss et al., "Capillary Isoelectric Focusing Coupled Offline to Matrix Assisted Laser Desorption/ Ionization Mass Spectrometry with Syringe Pump Mobilization," J Chromatogr. A Jan. 1, 2010; 1217(1): 179-182 (Year: 2010).*

(Continued)

*Primary Examiner* — Alexander S Noguerola
(74) *Attorney, Agent, or Firm* — Cantor Colburn LLP

(57) ABSTRACT

The present invention relates to a single point detection type microfluidic chip isoelectric focusing. The single point detection type microfluidic chip isoelectric focusing uses a microfluidic chip including first and second electrode portions storing each electrode solution at both ends and a microfluidic channel between the first and second electrode portions and includes a focusing step of respectively connecting each electrode to the first electrode portion and the second electrode portion and applying an electric field thereto to separate a biomolecule to an isoelectric point, a mobilization step of moving the focused biomolecule toward a detection point by removing the electrode solution in the first electrode portion or the second electrode portion, and a detection step of the biomolecule moved toward the detection point.

16 Claims, 14 Drawing Sheets

(56) References Cited

U.S. PATENT DOCUMENTS

| | | | |
|---|---|---|---|
| 2004/0100268 A1* | 5/2004 | Sanders | C07K 1/24 324/453 |
| 2005/0224350 A1 | 10/2005 | Sibbett | |
| 2010/0147688 A1* | 6/2010 | El Hadidy | B01L 3/502715 204/452 |
| 2012/0160691 A1 | 6/2012 | Mahabadi et al. | |

OTHER PUBLICATIONS

Flintbox product description for Fluorescent pI Markers for Isoelectric Focusing Separations downloaded from https://www.flintbox.com/public/project/26715/ on Jun. 4, 2019, published Jan. 7, 2015 (Year: 2015).*

Tan et al., "Miniaturized capillary isoelectric focusing in plastic microfluidic devices," Elecrophoresis 2002, 23, 3638-3645 (Year: 2002).*

Online Oxford English dictionary definition of "vertical", downloaded Jun. 5, 2019 (Year: 2019).*

Online Oxford English dictionary definition of "back and forth", downloaded Jun. 5, 2019 (Year: 2019).*

Hergenröder et al., Conductivity Detection on Microchips, From Methods in Molecular Biology, vol. 339: Microchip Capillary Electrophoresis: Methods and Protocols edited by C. S. Henry © Humana Press Inc., Tolowa, NJ (Year: 2006).*

English language translation of Chapter 6. .Inductive Conductivity Measurement Method and Protein Analysis Experiment through Isoelectric Electrophoresis Evaporative Temperature Control and Noninvasive Conductivity Detection Method of Protein in a Lab-on-a-chip Device, Myongi University, (Feb. 2016) (Year: 2016).*

Christelle Guillo et al., On-chip pumping for pressure mobilization of the focused zones following microchip isoelectric focusing, 2007, pp. 112-118, 7, Lab Chip, The Royal Society of Chemistry.

Nicole Pamme, et al., "The 20th International Conference on Miniaturized Systems for Chemistry and Life Sciences", Dublin, Ireland, (Oct. 9-13, 2016), pp. 1-9.

Chapter 6. Inductive Conductivity Measurement Method and Protein Analysis Experiment through Isoelectric Electrophoresis, Evaporative Temperature Control and Noninvasive Conductivity Detection Method of Protein in a Lab-on-a-chip Device, Myongji University, (Feb. 2016), pp. 45-58.

* cited by examiner

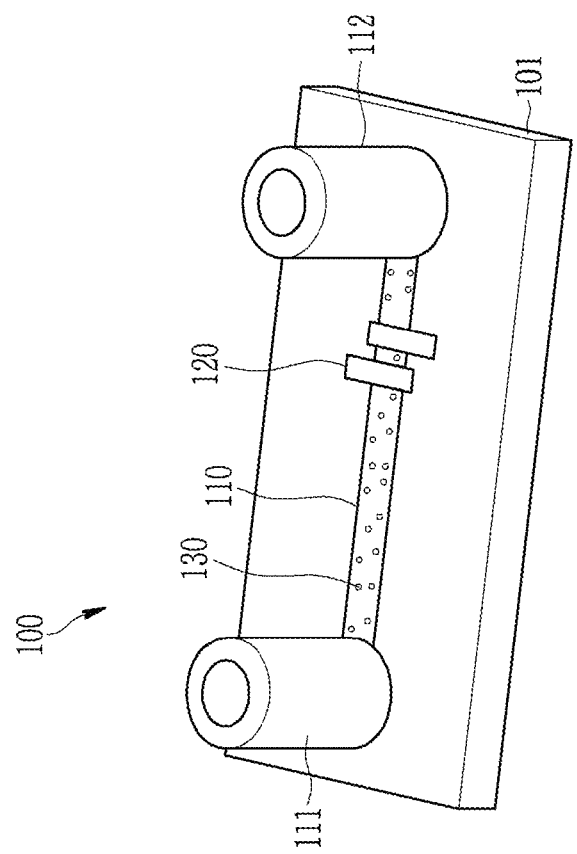

SINGLE POINT DETECTION TYPE MICROFLUIDIC ISOELECTRIC FOCUSING ASSAY AND CHIPS USING THE SAME

CROSS-REFERENCE TO RELATED APPLICATION

This application claims priority to and the benefit of Korean Patent Application No. 10-2017-0038364 filed in the Korean Intellectual Property Office on Mar. 27, 2017, the entire contents of which are incorporated herein by reference.

BACKGROUND OF THE INVENTION

(a) Field of the Invention

The present invention relates to an isoelectric focusing. More particularly, the present invention relates to a single point detection type microfluidic isoelectric focusing and a microfluidic chip for applying the same.

(b) Description of the Related Art

An isoelectric focusing (IEF) is an analytical technique of separating and detecting a protein, amino acid, DNA, RNA, a cell, a virus, and the like with a reference to an own inherent isoelectric point of a biomolecule. Particularly, the isoelectric focusing is generally used to analyze modification of the protein through an isoform, a post-translational modification, and a genetic recombination of the protein and the like.

As the isoelectric focusing is increasingly applied in a wider field, a microfluidic chip for performing the isoelectric focusing is also increasingly required of being simple and in a small form factor. Particularly, as the microfluidic chip is being down-sized, a detection instrument also needs to be simpler and in a smaller form factor for point-of-care testing (POCT).

Since a currently developed and commercially available IEF system is mostly a fluorescence detection-based whole-column imaging system that uses a bulky equipment such as a fluorescence microscope and an expensive equipment such as an optical scanner or a motorized table, a precise mechanical device and a control unit are required. In addition, the fluorescence detection necessarily requires a fluorescent labeling process and thus needs a complex assay procedure.

SUMMARY OF THE INVENTION

The present disclosure provides a single point detection type isoelectric focusing assay.

The present disclosure is to provide a microfluidic chip for a single point detection type isoelectric focusing assay.

A single point detection type isoelectric focusing assay according to example embodiments, in a microfluidic chip isoelectric focusing using a microfluidic chip including first and second electrode portions storing each electrode solution at both ends and a microfluidic channel between the first and second electrode portions, includes a fluid loading step of loading a mixed fluid of a carrier ampholyte and a biomolecule into the microfluidic channel, a focusing step of separating the biomolecule to an isoelectric point and focusing it by connecting each electrode to the first electrode portion and the second electrode portion and applying an electric field thereto, a mobilization step of moving the focused biomolecule toward a detection point by removing the electrode solution of the first electrode portion or the second electrode portion or charging the first electrode portion or the second electrode portion with the electrode solution, and a detection step of detecting the biomolecule moved toward a detection point.

A microfluidic chip for the single point detection type isoelectric focusing assay according to example embodiments includes a first electrode portion, a second electrode portion, a separation channel connected to the first electrode portion, loaded with a biomolecule, having a pH gradient, and focusing the biomolecule at the isoelectric point by an electric field applied thereto, and a detection channel having one end connected to the separation channel and the other end connected to the second electrode portion, loaded with an electrode solution, wherein the focused biomolecule appears through mobilization when the electrode solution of the second electrode portion is removed.

The single point detection type isoelectric focusing assay according to example embodiments may also downsize a detection instrument along with downsizing of the microfluidic chip and thus improve a protein assay system that depends on a conventional complex and expensive optical equipment.

As for the single point detection type isoelectric focusing assay according to example embodiments, the necessarily required fluorescent labeling-process may be omitted unlike the fluorescence-based whole-column imaging system, a biomolecule assay procedure may be simplified, and since a measurement system is simple, the detection equipment may be downsized.

In the single point detection type according to example embodiments, when a contactless conductivity method is used for a detection, the biomolecule analysis system consists of only electrical components and thus the microfluidic chip may be downsized and simplified. Accordingly, development of a portable and point-of-care testing device may be facilitated promoted.

BRIEF DESCRIPTION OF THE DRAWINGS

FIGS. 4A to 4C are schematic views showing a microfluidic chip isoelectric focusing process using the single point detection type microfluidic chip according to an example embodiment of the present invention.

DETAILED DESCRIPTION

Figure 1:
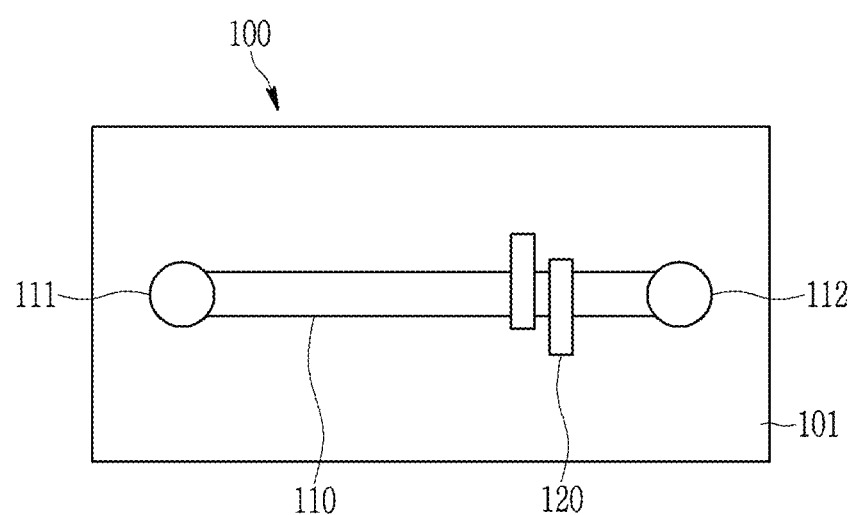
FIG. 1 is a schematic view showing a single point detection type microfluidic chip according to an example embodiment of the present invention.

Hereinafter, referring to the drawings, embodiments according to the present invention are explained in detail. Structures and effects of the present invention are clearly understood through the following detailed description.

Before describing the present invention in detail, the same constituent elements are, if possible, marked with the same reference numerals, even though given in other drawings, and publicly known elements may not be specifically described when considered to weaken a gist of the present invention. FIG. 1 is a schematic view showing a single point detection type microfluidic chip 100 according to an example embodiment. The microfluidic chip 100 includes a substrate 101, and a microfluidic channel 110, and a plurality of electrodes 120 on the substrate 101. In addition, the microfluidic chip 100 may further include an anode portion 111 and a cathode portion 112 connected to both ends of the microfluidic channel 110.

The substrate 101 may use any material having appropriate properties for forming the microfluidic channel 110. For example, the material may include glass, quartz, fused silica, PMMA (polymethyl methacrylate), COC (cyclic olefin copolymer), PC (polycarbonate), PDMS (polydimethylsiloxane), and the like. The microfluidic channel 110 provides a moving path for a fluid. For example, the microfluidic channel 110 may be pipe-shaped. For example, the microfluidic channel 110 may be a pipe having a diameter ranging from about 75 to about 100 μm and a circular or polygonal cross section.

In addition, the internal surface of the microfluidic channel 110 may be coated with at least one coating solution selected from methyl cellulose (MC), hydroxyethyl cellulose (HEC), (hydroxypropyl)methyl cellulose (HPMC), and linear polyacrylamide (LPA). When the internal surface of the microfluidic channel 110 is coated with the coating solution, the internal surface of the microfluidic channel 110 may not only be prevented from adsorption of a biomolecule, but an electrophoresis resolution may also be improved by reducing an electroosmotic flow generated when an electric field is applied. In addition, the coating solution may be added to a carrier ampholyte (CA) included in the microfluidic channel. The addition of the coating solution to the carrier ampholyte is to hinder dispersion of the biomolecule and thus focus it into a sharper protein peak, and prevent damage on the internal surface coating of the microfluidic channel.

In the single point detection type microfluidic chip 100, both an optical detection method and an electrical detection method may be used. The electrical detection method may include a potentiometric method, an amperometric method, a conductivity method, a contactless conductivity method, and the like, and FIG. 1 shows an electrode 120 for applying the contactless conductivity method to downsize and to simplify the microfluidic chip 100. The contactless conductivity method may simplify a process, since the electrode does not need to be inserted inside the microfluidic channel 110, and minimize generation of a gas due to an electrolysis and a side effect such as a contamination due to impurities produced through an electrochemical reaction and the like. The electrode 120 includes a plurality of electrodes. The electrode 120 is indirectly connected to the microfluidic channel 110. The location for connection of the electrode 120 with the microfluidic channel 110 is not particularly limited, but the electrode 120 may be indirectly connected to the microfluidic channel 110 to apply an electric field to a microfluid in the microfluidic channel 110.

In addition, the electrode 120 may be patterned on the surface of the microfluidic chip 100 through a semiconductor microfabrication process, a silk-screening, or a conductivity ink as an example embodiment.

Furthermore, a PCB substrate patterned with the electrode 120 may be clamped into the microfluidic chip as another example embodiment. Since the clamping of the PCB substrate patterned with the electrode does not need an additional process for forming an electrode in the microfluidic chip and reuses the electrode patterned on the substrate and thus may cost low, but since capacitance changes depending on a contact degree, an aspect of a detected output signal may be varied.

The electrode 120 may be a pair. One of the pair of electrodes is to input a high frequency alternating current (AC) signal, and the other electrode is to measure a current passing a solution inside the microfluidic channel 110. Herein, the surface of the electrode 120 between the solution inside the microfluidic channel 110 and the electrode 120 is formed of an dielectric material such as the aforementioned COC, PDMS, PMMA, PC, and the like and thus does not transfer a DC signal input from the electrode. However, when a high frequency alternating current (AC) voltage is applied thereto, a capacitor is comprised of the solution inside the microfluidic channel 110, an dielectric layer of the substrate 101, and the electrode 120 and thus passes a current through the dielectric layer of the substrate 101. The current passing the dielectric layer is affected by an amplitude and a frequency of the input signal. Accordingly, with a reference to electrical conductivity of the solution inside the microfluidic channel, the biomolecule may be analyzed by using an electrical conductivity difference between the biomolecule and the solution. In this way, the contactless conductivity method may be used to downsize and simplify the microfluidic chip 100. In addition, the downsized and simplified microfluidic chip 100 may be better integrated into a wearable device or a smart device.

Figure 2A:
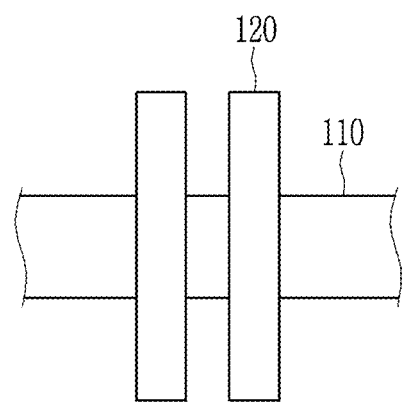
FIG. 2A and FIG. 2B shows an electrode arrangement of the single point detection type microfluidic chip according to an example embodiment of the present invention.
Figure 2B:
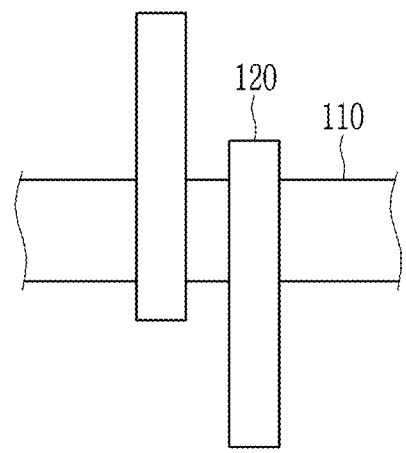

In addition, the electrode 120 may be disposed with a parallel array or an antiparallel array. As for the electrode 120 directly/indirectly connected to the microfluidic channel 110, a plurality of electrodes may be arranged perfectly parallel one another in a vertical direction with the microfluidic channel as shown in FIG. 2A, which is defined as a parallel array in the present invention. In addition, as shown in FIG. 2B, a plurality of electrodes 120 is parallel one another in a vertical direction with the microfluidic channel but goes across back and forth in a horizontal direction, which is defined as an antiparallel array in the present invention. The antiparallel array requires a more complex electrical wiring but results in an excellent signal-to-noise ratio and thus is commonly used compared with the parallel array.

The microfluidic chip 100 wherein the electrode is indirectly connected to the outside of the microfluidic channel may be used to perform a microfluidic chip isoelectric focusing in the contactless electrical conductivity method wherein the electrode does not directly contact the solution.

The electrode 120 may be formed of any material capable of functioning as an electrode, for example, gold, platinum, copper, aluminum, ITO, a conductive polymer, carbon, and the like.

Figure 3:
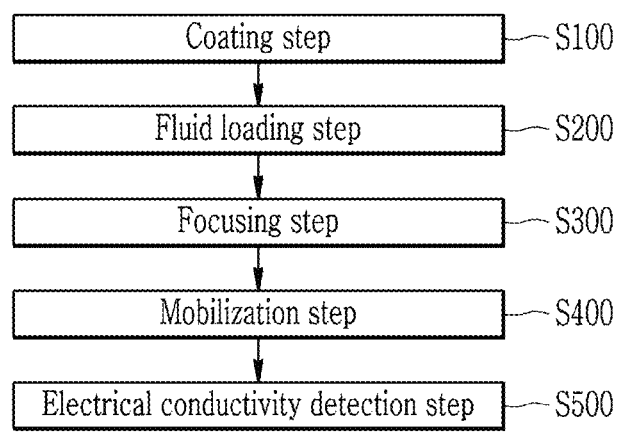
FIG. 3 is a flow chart of a single point detection type microfluidic chip isoelectric focusing according to an example embodiment of the present invention.
Figure 4B:
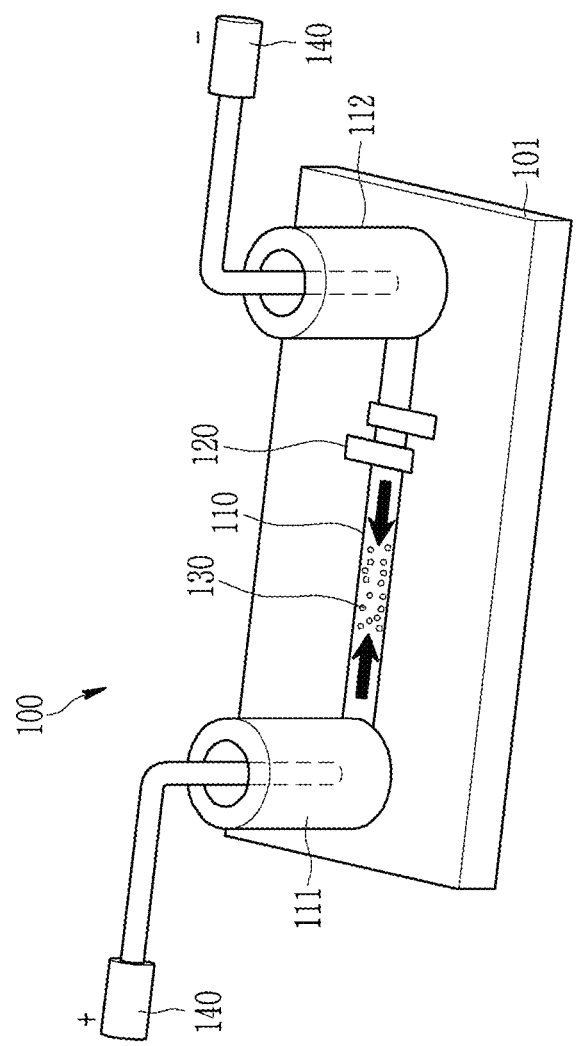
Figure 4C:
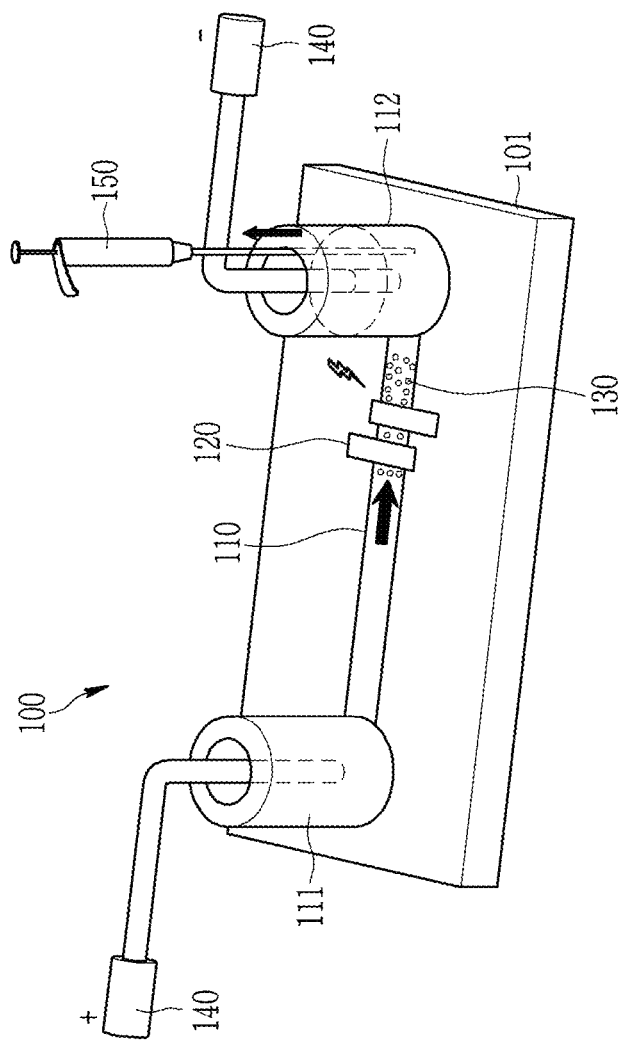

FIG. 3 is a flowchart showing a single point detection type microfluidic chip isoelectric focusing according to an example embodiment of the present invention, and FIGS. 4A to 4C are schematic views showing a process of the single point detection type microfluidic chip isoelectric focusing (IEF). FIG. 3 and FIGS. 4A to 4C illustrate CA-IEF using a carrier ampholyte (CA). The single point detection type microfluidic chip isoelectric focusing includes a coating step (S100), a fluid loading step (S200), a focusing step (S300), a mobilization step (S400), and an electrical conductivity detection step (S500).

FIG. 4A is a schematic view showing the coating step (S100) and the fluid loading step (S200). The coating step (S100) includes cleaning and then, coating the internal surface of the microfluidic channel 110 of the microfluidic chip 100. For example, the internal surface of the microfluidic channel 110 may be coated with at least one coating solution selected from MC, HEC, HPMC, and LPA. The coating step (S100) is to prevent non-specific adsorption of a protein on the internal surface of the microfluidic channel 110. The fluid loading step (S200) is to load a fluid into the microfluidic channel 110, and herein, the fluid includes a biomolecule 130, a carrier ampholyte (CA), and at least one coating solution selected from MC, HEC, HPMC, and LPA and is loaded into the microfluidic channel 110, and then, an acidic anode solution and a basic cathode solution are respectively loaded into an anode portion 111 and a cathode portion 112 of the microfluidic chip 100. The anode solution may be an acidic solution such as 70 mM phosphoric acid ($H_3PO_4$), the cathode solution may be a basic solution such as 50 mM NaOH, and both of them may include a highly viscous polymer material such as MC, HEC, HPMC, LPA, and the like to prevent an electroosmotic flow. FIG. 4A shows that the biomolecule 130 is randomly dispersed in the microfluidic channel 100 after the fluid is loaded into the microfluidic chip 100.

FIG. 4B is a schematic view showing the isoelectric focusing (IEF) step (S300).

When a predetermined or higher potential difference is applied after inserting electrodes 140 respectively into the anode portion 111 and the cathode portion 112, the carrier ampholyte (CA) dissolved in the fluid is aligned in order of a pI (an isoelectric point) and forms a pH gradient. Herein, the biomolecule loaded therewith is focused (separated and concentrated) on its own isoelectric point. CA-IEF takes greater than or equal to about 1 hour, specifically, greater than or equal to about 30 minutes, and more specifically, greater than or equal to about 10 minutes to focus the biomolecule 130 and in addition, may reuse the microfluidic chip 100 compared with IPG (Immobilized pH Gradient)-IEF.

The biomolecule 130 may include nucleic acid such as DNA, RNA, PNA (peptide nucleic acid), LNA, and the like, a protein such as an antigen, an antibody, and the like, oligopeptide, a cell such as a human cell, an animal cell, a plant cell, and the like, and a microorganism such as a virus, bacteria, and the like.

The mobilization step (S400) is to move the focused biomolecule 130 toward a detection point. The detection point is where the electrode 120 arrayed in the microfluidic chip 100 is positioned. The mobilization step (S400) may be to move the isoelectrically focused (IEF) biomolecule 130 toward the detection point by removing the electrode solution. Through this mobilization step (S400), a single point detection may be performed. FIG. 4C shows that biomolecule 130 is moved toward the cathode portion 112 by removing a predetermined amount of the electrode solution at the cathode portion 112 with an automatic or hand syringe or pipette 150. However, the biomolecule 130 may be surely moved toward the anode portion 111 by removing the electrode solution of the anode portion 111, depending on a position of the electrode 120.

The mobilization step through the removal of the electrode solution may contribute to downsizing and simplifying the microfluidic chip 100 compared with a conventional chemical mobilization method, an electroosmotic flow mobilization method, or a pressure mobilization method. The chemical mobilization method is referred to as an electrophoresis mobilization method. The mobilization may be directed toward an anode by adding a salt solution such as a basic solution or sodium chloride to the anode solution (acidic) of the anode portion. On the contrary, the mobilization may be directed toward a cathode by replacing the acidic solution with a cathode solution (basic) or adding a salt solution thereto. However, this method destroys a pH gradient during the mobilization and thus deteriorates a protein-concentrated peak and resultantly, decreases a resolution.

The electroosmotic flow mobilization uses an electroosmotic flow generated by charging a capillary wall during electrophoresis. Since the electroosmotic flow mobilization is largely influenced by surface characteristics of a channel which a fluid contacts, it is difficult to predict a speed and a direction of a flow, which may not be used to control movement of a protein.

The pressure mobilization due to a pressure difference may be referred to as a hydraulic mobilization and is to move an isoelectrically focused protein toward a detection point by applying a pressure or vacuum. The pressure mobilization due to a pressure difference is performed by applying an electric field to a channel in order to prevent destruction of the pH gradient during the mobilization. The pressure mobilization is in general realized by using a pump. In order to connect the pump with an anode portion or a cathode portion, an additional complex equipment such as a loading loop, a dialysis membrane, and the like are required.

In addition, a pump generating a high pressure is limitedly downsized and consumes large power and thus may be inappropriate for a portable point-of-care testing device. On the contrary, a method of removing the electrode solution such as the cathode solution or the anode solution according to an example embodiment of the present invention may not have difficulty of mounting a loading loop, a dialysis membrane, and the like on the anode portion 111 and the cathode portion 112 in a state that an electrode for IEF is disposed. In addition, since an amount of the electrode solution is constantly kept to maintain a sharpness of protein peaks separated through the isoelectric focusing according to a person of an ordinary skill in the art, the method of removing the electrode solution is new beyond the conventional methods. As for a conventional capillary IEF (CIEF or Capillary IEF), since a sample is in general loaded into tens to hundreds of cm-long capillary through a pump, which is conventionally equipped to load the sample, the method of removing the electrode solution is non-obvious to a person of an ordinary skill in the art.

Lastly, the electrical conductivity detection step (S500) is to measure electrical conductivity of the biomolecule 130 moved toward the detection point. As shown in FIG. 4C, when the biomolecule 130 moves toward a detection point, electrical conductivity is locally reduced. The local reduction of electrical conductivity may be used to analyze the biomolecule. For example, a protein has more surface charges and less apparent mobility than a carrier ampholyte (CA) does. Accordingly, the carrier ampholyte is less concentrated at a point where the protein is focused to maintain an electroneutrality condition and locally reduces electrical conductivity, and thus a reverse peak is observed.

Figure 5:
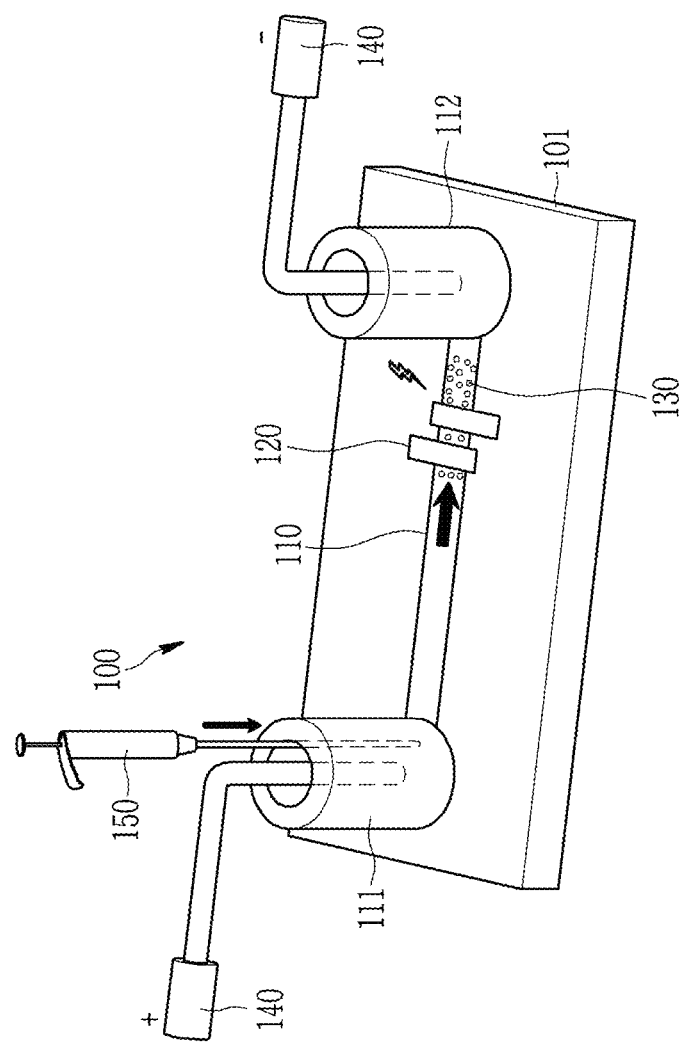
FIG. 5 is a schematic view illustrating a mobilization according to another example embodiment of the present invention.

FIG. 5 is a schematic view illustrating a mobilization method according to another example embodiment of the present invention. The mobilization may be performed in the method of removing an electrode solution as shown in FIG. 4B but in a method of charging the electrode solution by using a pipette 150 as shown in FIG. 5. FIG. 5 shows that the mobilization is performed by charging the electrode solution in an anode portion. The charging the electrode solution instead of removing it may be effective in case that pH of an anode solution or a cathode solution may be changed by electrolysis at a corresponding electrode through a very long isoelectric focusing. The isoelectric focusing may be stably performed by charging the electrode solution.

Figure 6A:
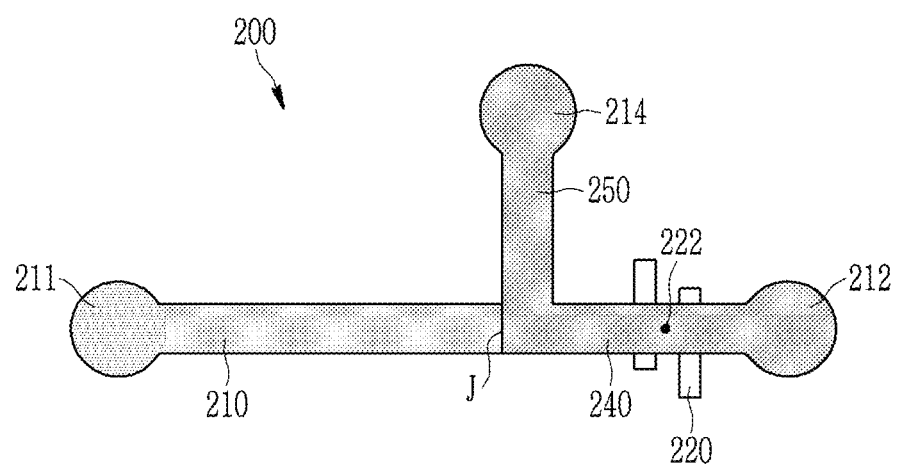
FIGS. 6A to 6C are schematic views showing a single point detection type microfluidic chip isoelectric focusing process using the single point detection type microfluidic chip according to another example embodiment of the present invention.
Figure 6B:
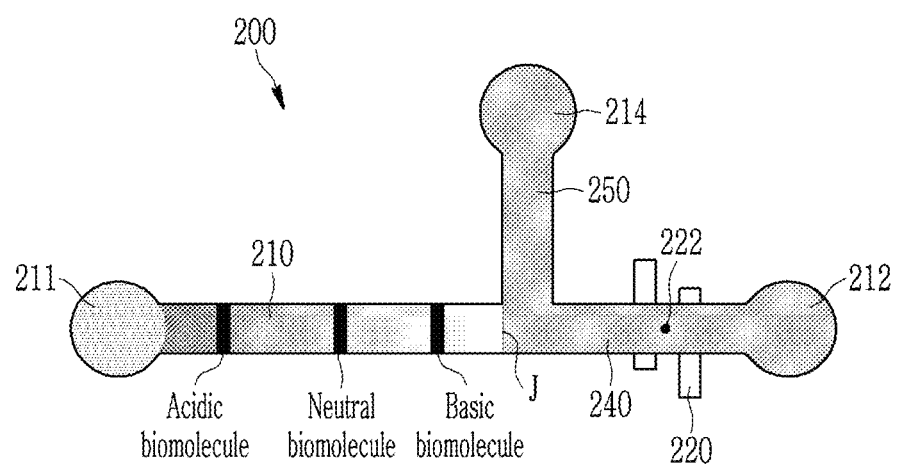
Figure 6C:
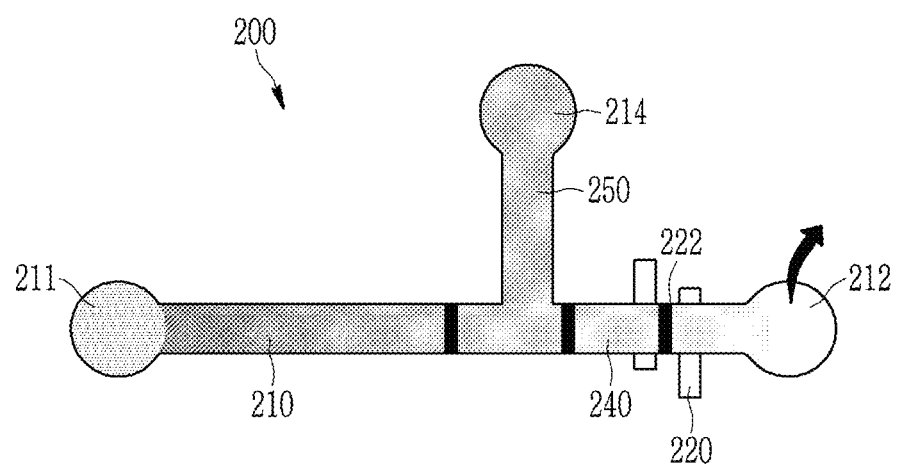

FIGS. 6A to 6C are schematic views showing a single point detection type microfluidic chip isoelectric focusing process by using a single point detection type microfluidic chip according to another example embodiment of the present invention.

Referring to FIG. 6A, a single point detection type microfluidic chip 200 according to another example embodiment does not have a single channel but a channel structure of a separation channel 210 and a detection channel 240. A junction (J) is present between the separation channel 210 and the detection channel 240. In addition, an auxiliary channel 250 may be further included to easily form the separation channel 210 and the detection channel 240. The auxiliary channel 250 is branched at the junction (J) where it contacts the separation channel 210, and the electrode solution is loaded in the following fluid loading step (S400). The separation channel 210 is between an anode portion 211 and the junction (J), a detection channel 240 is between a first cathode portion 212 and the junction (J), and an auxiliary channel 250 is between a second cathode portion 214 and the junction (J). Since electrodes 220 are formed on the detection channel 240, a detection point 222 is placed between the electrodes 220.

FIG. 6A is a schematic view illustrating the coating step (S100) and the fluid loading step (S400).

After cleaning the internal surfaces of the separation channel 210, the detection channel 240, and the auxiliary channel 250 and then coating them with MC, HEC, HPMC, LPA, and the like, the separation channel 210, the detection channel 240, and the auxiliary channel 250 are supplied with a fluid of a carrier ampholyte (CA), a biomolecule, and a coating solution through the anode portion 211, the first cathode portion 212, and the second cathode portion 214. Subsequently, the first cathode portion 212 and the second cathode portion 214 are filled with the cathode solution while the anode portion 211 is covered with a lid to stop a flow of the fluid, and the auxiliary channel 250 and the detection detection channel 240 may be filled with the cathode solution by applying vacuum thereto. Specifically, when the vacuum is applied to the first cathode portion 212 while the first cathode portion 212 and the second cathode portion 214 are filled with the cathode solution, but the anode portion 211 is covered with a lid, the cathode solution fills the auxiliary channel 250 and the detection channel 240 in order, while the cathode solution does not move toward to the separation channel 210 since the anode portion 211 is blocked with the lid. As a result, the carrier ampholyte (CA) filled in the detection channel 240 is replaced with the cathode solution, and thus the carrier ampholyte is present only in the separation channel 210, but the carrier ampholyte and the cathode solution contact each other and form a junction (J) where the separation channel 210 contacts the detection channel 240. On the contrary, when the second cathode portion 214 is applied with vacuum after covering the anode portion 211 with the lid but the first cathode portion 212 and the second cathode portion 214 with the cathode solution, the cathode solution fills the detection channel 240 and the auxiliary channel 250 in order since the anode portion 211 is covered with the lid. Herein, an amount of the cathode filled therein solution is infinitesimally 1 μL, which has no influence on the following analysis. The auxiliary channel 250 may have any appropriate width for a flow of the cathode solution and thus the same width as that of the detection channel 240 or a smaller width than that. For example, the auxiliary channel 250 may have a width of less than or equal to about 10 μm. In addition, the auxiliary channel 250 may have any appropriate length for forming the separating channel 210 and thus need not have the same length as that of the measuring channel 230 but may have a shorter length than that. Furthermore, the auxiliary channel 250 is not necessarily vertical with the separating channel 210 or the measuring channel 220 but may have various angles unless they contact the electrode 220. When detection is performed by an electrical method, the size of the microfluidic chip 200 can be reduced by forming the auxiliary channel 250 so as to be inclined in the direction of the separation channel 210 so as not to make contact with the electrode 220 as much as possible. For example, the angle between the auxiliary channel 250 and the detection channel 240 may be 135 degrees or more. When the optical method without electrode 220 is used, the auxiliary channel 250 may be inclined toward the detection channel 240 or inclined toward the separation channel 210. That is, the angle between the auxiliary channel 250 and the detection channel 240 may be preferably be in the range of 45 to 135 degrees.

FIG. 6B is a schematic view illustrating the isoelectric focusing (IEF) step (S300).

When an electric field is applied to an anode and a cathode after filling the anode portion 211 and the first cathode portion 212 with an electrode solution (about 20 to 30 μL) and then, inserting the anode into the anode portion 211 and the cathode into the first cathode portion 212, a biomolecule 230 is focused (separated and concentrated) on its own isoelectric point on the separation channel 210. In other words, the biomolecule 230 is focused along the isoelectric point from acid to base only in the separation channel 210 disposed at the left of the detection channel 240.

FIG. 6C is a schematic view illustrating the mobilization step (S400).

After IEF is complete, when the second cathode portion 214 is covered with a lid to limit a flow of the fluid, and the cathode solution of the first cathode portion 212 is removed, a solution in the separation channel 210 gradually moves toward the detection channel 240, and a protein separated at the isoelectric point also sequentially moves toward a detection point 220. When the mobilized biomolecule 230 reaches the detection point, an amount of the protein may be measured by reading a signal in an optical or electrical method.

When a straight channel is used, downsizing of the microfluidic chip may be improved, but a pH gradient is formed over the straight channel, where proteins are focused, and thus it may be difficult to detect a strong basic protein concentrated between a detection point 122 and the cathode portion 122. Likewise, when the detection point is placed around the anode portion, it may be difficult to detect a strong acidic protein concentrated between the two points.

On the contrary, when a T-shaped channel is used referring to FIGS. 6A to 6C, a pH gradient is formed only in the separation channel 210 and mobilized toward a detection point 222, and thus all the proteins may be detected within the pH gradient range.

Hereinafter, the present invention is illustrated through Examples in detail. Examples are exemplarily provided to illustrate the present invention but do not limit a scope of the present invention, which is clearly understood by a person skilled in the art.

Example 1

Figure 7A:
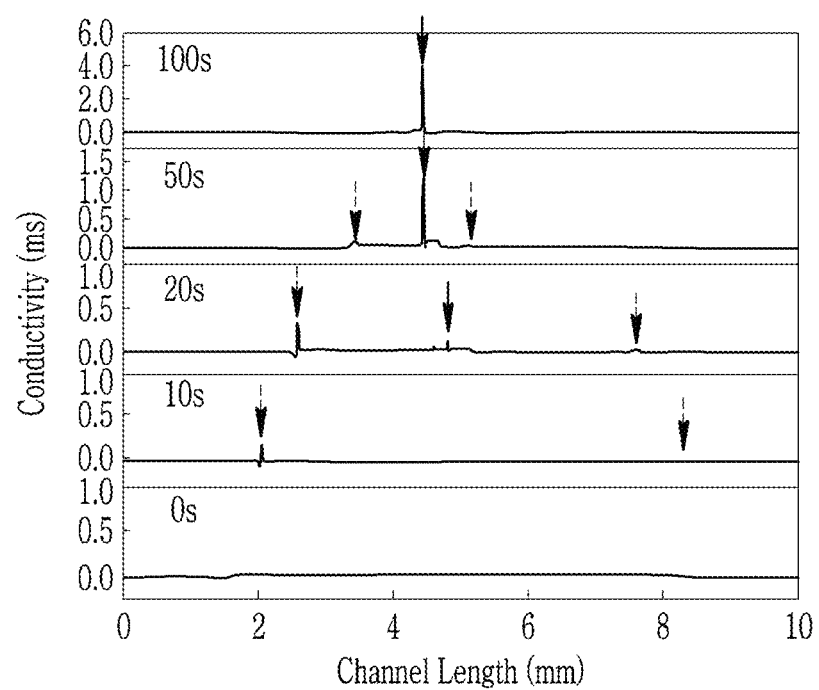
FIG. 7A and FIG. 7B shows a numerical simulation result of the single point detection type microfluidic chip isoelectric focusing according to an example embodiment of the present invention.

A numerical simulation about a microfluidic chip isoelectric focusing based on a contactless electrical conductivity measurement was performed by using a software of Simul 5. A 10 mm microfluidic channel, 0.625 mM carrier ampholyte (CA) within a range of pH 3 to 10, a 10 μM green fluorescent protein (GFP), a 70 mM $H_3PO_4$ anode solution, a 50 mM NaOH cathode solution, and a 200 V separation voltage were used as an simulation input. In addition, conductivity and concentration data were collected and analyzed as a function of time and position. The numerical simulation results are shown in FIG. 7. FIG. 7A shows an estimation result through a simulation of a protein concentration depending on a position of a microfluidic channel. Referring to FIG. 7A, two boundaries of protein move from both ends of the microfluidic channel toward a focusing point (an isoelectric point) (a dashed arrow). One hundred seconds later after the isoelectric focusing, two protein boundaries were united at the focusing point and appeared as one protein peak (a solid arrow).

Figure 7B:
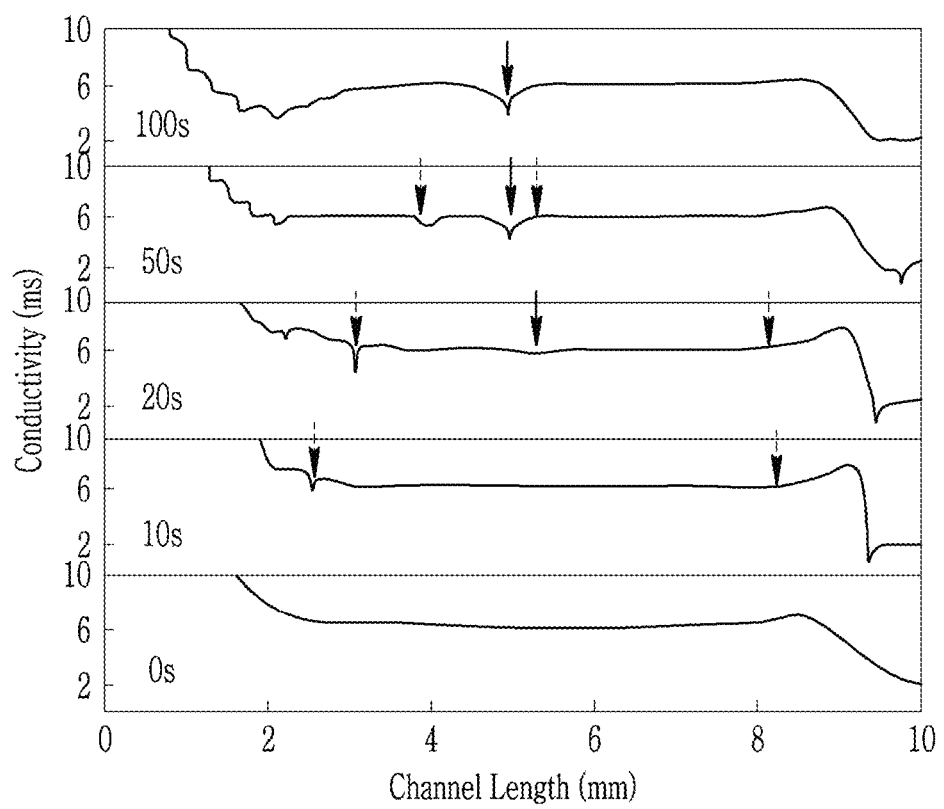

FIG. 7B shows an estimation result through a simulation of electrical conductivity depending on a position of a microfluidic channel. Referring to FIG. 7B, two reverse peaks (a dashed arrow) tracing a position of the protein boundary of FIG. 7A are united as one peak (a solid arrow) over time.

Example 2

A cyclic olefin copolymer microfluidic chip having a 140 μm cover slip wherein a pair of electrodes is attached and a 18 mm straight microfluidic channel was used to analyze a protein through a microfluidic chip isoelectric focusing based on a contactless electrical conductivity measurement. The pair of electrodes has an electrode gap of 0.7 mm between themselves.

After cleaning the microfluidic chip, the internal surface of the microfluidic channel was coated with a 4% hydroxy ethyl cellulose (HEC). The HEC coating is to prevent non-specific attachment of a protein on the internal surface of the microfluidic channel and to minimize an electroosmotic flow.

A 25 μM green fluorescent protein (GFP) as a sample, a 2% carrier ampholyte (CA), and a 4% w/v HEC were loaded into the microfluidic channel. The loaded HEC functions as a dynamic coating and a separation matrix. In addition, 50 mM sodium hydroxide (NaOH) including 2% w/v HEC was added to the anode portion in the microfluidic channel. 70 mM phosphoric acid ($H_3PO_4$) including 2% w/v HEC was added to the cathode portion of the microfluidic channel.

Subsequently, a separation voltage of 100 V was applied thereto to form a pH gradient and focus a protein in the microfluidic channel. As the voltage was applied, the green fluorescent protein as a sample was focused on an isoelectric point as shown in FIG. 4B.

The focused green fluorescent protein was mobilized up to a detection point. The mobilization was performed by removing 10 μL of the cathode solution yielding a pressure or vacuum, and the green fluorescent protein focused at the isoelectric point was moved toward the detection point.

Electrical conductivity of the green fluorescent protein mobilized toward the detection point was measured to analyze the protein by detecting local reduction of electrical conductivity.

In the focusing and mobilization step, a fluorescence microscope was used for monitoring, and in the detection step, a capacitively-coupled contactless conductivity detection (C4D) system was used to measure the electrical conductivity.

FIG. 8 shows a protein analysis result through a microfluidic chip isoelectric focusing based on a contactless electrical conductivity measurement.

Figure 8A:
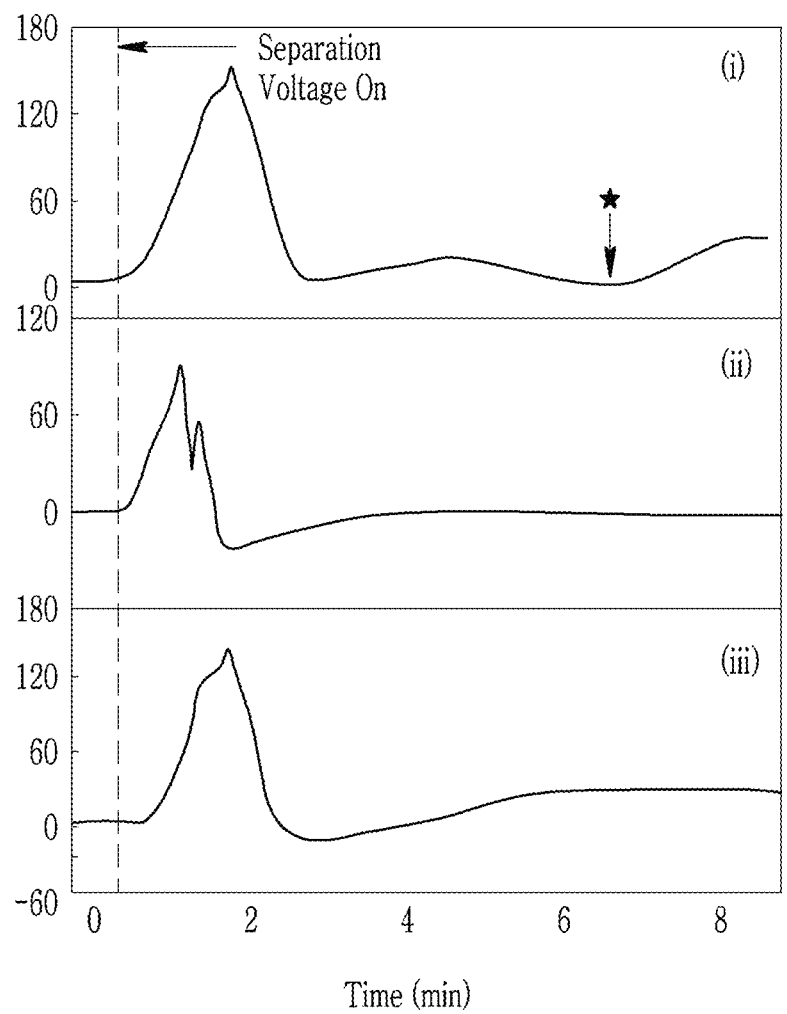
FIG. 8A and FIG. 8B shows a single point detection type microfluidic chip isoelectric focusing experimental result according to an example embodiment of the present invention.

FIG. 8A shows the electrical conductivity measurement result depending on time after applying a separation voltage ((i) GFP detection result, (ii) background measurement, (iii) control experiment). According to FIG. 8A, the electrical conductivity is increased due to local charge of the carrier ampholyte (CA) after applying the separation voltage to the microfluidic channel but decreased after a pH gradient is formed.

Figure 8B:
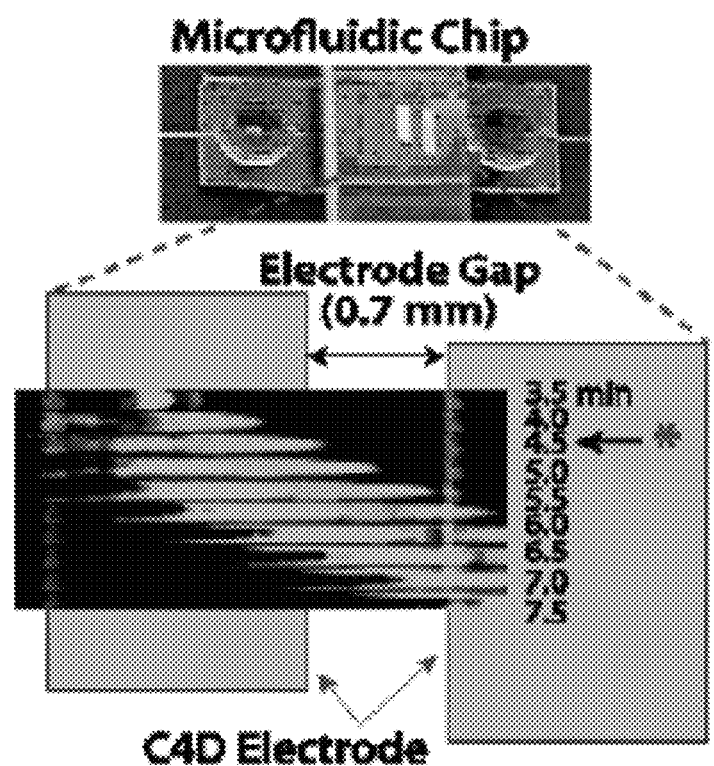

As shown in FIG. 8B, when the focused green fluorescent protein passed a detection point (at about 4.5 minutes) through the mobilization, its band resulted in a reverse peak of 31.5±2.1 mV (n=5). In addition, there was no peak in (ii) the background measurement and (iii) the control experiment which were experimented without a green fluorescent protein. Referring to these results, the reverse peak comes from the green fluorescent protein band.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

<Description of Symbols>

| | |
|---|---|
| 100: microfluidic chip | 110: microfluidic channel |
| 111: anode portion | 112: cathode portion |
| 120: electrode | 130: biomolecule |
| 200: microfluidic chip | 210: separation channel |
| 240: detection channel | 250: auxiliary channel |
| 211: anode portion | 212: cathode portion |
| 220: electrode | 222: detection point |

What is claimed is:

1. A method of using a single-point detection type microfluidic chip for isoelectric focusing, wherein the single-point detection type microfluidic chip comprises first and second electrode portions, into which an electrode solution is loaded, and a microfluidic channel between the first and second electrode portions, the method comprising:
   a fluid loading step wherein a mixed fluid of a carrier ampholyte and a biomolecule is loaded into the microfluidic channel;
   a focusing step wherein the biomolecule is separated into an isoelectric point by connecting an electrode to each of the first electrode portion and the second electrode portion and then, applying an electric field thereto;
   a mobilization step wherein the focused biomolecule is moved toward a detection point by removing or charging the electrode solution present in the first electrode portion or the second electrode portion; and
a detection step wherein the biomolecule moved toward the detection point is measured
wherein the single-point detection type microfluidic chip further comprises:
the microfluidic channel connected to the first electrode portion and loaded with the biomolecule;
a separation channel having a pH gradient and focusing the biomolecule toward the isoelectric point by the electric field applied thereto;
a detection channel having one end connected to the separation channel and the other end connected to the second electrode portion, loaded with the electrode solution, and mobilizing and positioning the focused biomolecule when the electrode solution of the second electrode portion is removed; and
an auxiliary channel branched at a junction where the separation channel contacts the detection channel.

2. The method of claim 1, wherein the electrode solution is removed or charged by using a syringe or a pipette before the focusing step.

3. The method of claim 1, wherein the fluid loading step comprises
a first step of loading the mixed fluid of the carrier ampholyte and the biomolecule into the separation channel connected to the first electrode portion and the detection channel having one end connected to the separation channel and the other end connected to the second electrode portion; and
a second step of loading the electrode solution into the second electrode portion to place the mixed fluid of the carrier ampholyte and the biomolecule only in the separation channel but to fill the electrode solution in the detection channel.

4. The method of claim 3, wherein the internal surface of the microfluidic channel is coated with at least one coating solution selected from methyl cellulose (MC), hydroxyethyl cellulose (HEC), hydroxypropyl)methyl cellulose (HPMC), and linear polyacrylamide (LPA) before the fluid loading step.

5. The method of claim 1, wherein the fluid loading step comprises
a first step of loading the mixed fluid of the carrier ampholyte and the biomolecule into the separation channel connected to the first electrode portion, the detection channel having one end connected to the separation channel and the other end connected to the second electrode portion, and the auxiliary channel branched at a junction where the separation channel contacts the detection channel and is connected to a third electrode portion; and
a second step of loading the mixed fluid of the carrier ampholyte and the biomolecule only in the separation channel by filling the electrode solution in the second electrode portion and the third electrode portion while the first electrode portion is blocked and a vacuum is applied thereto and then, filling the electrode solution in the detection channel and the auxiliary channel.

6. The method of claim 5, wherein the mobilization step comprises moving the focused biomolecule toward the detection point of the detection channel by blocking the third electrode portion to limit a flow of a fluid therethrough and removing the electrode solution in the second electrode portion.

7. The method of claim 1, wherein the biomolecule moved to the detection point is measured by using an electrode equipped in the microfluidic channel.

8. The method of claim 7, wherein the electrode is provided in a pair, and the pair of electrodes are arranged parallel to each other and spaced apart from each other in a direction of the microfluidic channel, wherein ends of the pair of electrodes are mis-aligned to each other.

9. The method of claim 7, wherein the electrode is used to measure a local change of electrical conductivity.

10. A single-point detection type microfluidic chip comprising:
a first electrode portion and a second electrode portion;
a separation channel connected to the first electrode portion, loaded with a biomolecule, and having a pH gradient, wherein the biomolecule is focused toward an isoelectric point therein by an electric field applied thereto; and
a detection channel having one end connected to the separation channel and the other end connected to the second electrode portion, loaded with an electrode solution, and including a detection point where the focused biomolecule is mobilized and positioned when the electrode solution of the second electrode portion is removed.

11. The single-point detection type microfluidic chip of claim 10, which further comprises an auxiliary channel branched at a junction where the separation channel contacts the detection channel and is loaded with the electrode solution.

12. The single-point detection type microfluidic chip of claim 11, wherein the auxiliary channel has a width equal to or less than that of the detection channel.

13. The single-point detection type microfluidic chip of claim 11, wherein the auxiliary channel has a width of less than or equal to about 10 μm.

14. The single-point detection type microfluidic chip of claim 11, wherein the auxiliary channel has a length equal to or less than that of the detection channel.

15. The single-point detection type microfluidic chip of claim 11, wherein an angle between the auxiliary channel and the detection channel is 45 to 135 degrees.

16. The single-point detection type microfluidic chip of claim 10, which comprises an electrode for measuring a local electrical conductivity change due to the biomolecule at the detection point.

* * * * *